United States Patent [19]

Buter

[11] 4,104,240
[45] Aug. 1, 1978

[54] HIGH SOLIDS PIGMENT COATING COMPOSITION

[75] Inventor: Roelof Buter, Dieren, Netherlands

[73] Assignee: Akzo N.V., Arnhem, Netherlands

[21] Appl. No.: 749,698

[22] Filed: Dec. 10, 1976

[30] Foreign Application Priority Data

Dec. 15, 1975 [NL] Netherlands .................. 7514566

[51] Int. Cl.$^2$ .................................... C08G 37/30
[52] U.S. Cl. .......................... 260/39 P; 528/273
[58] Field of Search ............ 260/67.6 R, 75 NK, 39 P

[56] References Cited

U.S. PATENT DOCUMENTS

| | | | |
|---|---|---|---|
| 3,296,211 | 1/1967 | Winkler et al. ............. | 260/75 NK |
| 3,852,375 | 12/1974 | Biethou et al. ............. | 260/67.6 R |
| 3,857,817 | 12/1974 | Henshaw et al. ............. | 260/67.6 R |

*Primary Examiner*—Sandra M. Person
*Attorney, Agent, or Firm*—Stevens, Davis, Miller & Mosher

[57] ABSTRACT

A high solids pigmented coating composition is prepared from a curing agent and an ester diol binder which is a mixture of (a) 20-80 mole % of a compound having the general formula:

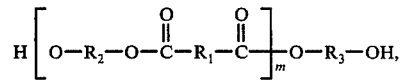

where $R_1$ represents the group formed by abstraction of the two carboxyl groups from a cycloaliphatic and/or aromatic dicarboxylic acid having 8 to 20 carbon atoms and $R_2$ and $R_3$ may be the same or different and represent groups formed by abstraction of the two hydroxyl groups from a divalent alcohol having 2 to 12 carbon atoms, and m is a number of 1 – 3, and (b) 80-20 mole % of a compound having the general formula:

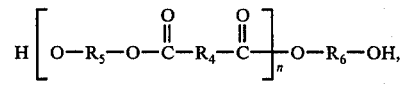

where $R_4$ represents the group formed by abstraction of the two carboxyl groups from an aliphatic dicarboxylic acid having 2 to 12 carbon atoms, and $R_5$ and $R_6$ may be the same or different and represent groups formed by abstraction of the two hydroxyl groups from a divalent alcohol having 2 to 12 carbon atoms, and n is a number of 1 – 3.

9 Claims, No Drawings

HIGH SOLIDS PIGMENT COATING COMPOSITION

This invention relates to a pigmented coating composition having a high solids content and prepared from a blend of an ester diol as a binder and a curing agent.

A composition prepared from a diester diol is disclosed in U.S. Pat. No. 3,857,817. The dicarboxylic acid disclosed for the preparation of the diester diol is either an aromatic dicarboxylic acid such as terephthalic acid, or an aliphatic dicarboxylic acid. Applicant has found now that, if the disclosed composition does not contain a pigment, the hardness and flexibility of the coating are satisfactory. If, however, the disclosed composition contains a pigment, which is often the case, then the hardness or flexibility is not entirely satisfactory.

It is therefore an object of this invention to provide a coating composition of the type described above which has both high flexibility and high hardness. Another object of the invention is to provide a pigmented coating composition prepared from a diester diol having improved hardness and flexibility characteristics.

In accordance with this invention, the foregoing objects and others are accomplished by providing a coating composition prepared with a mixture of (a) 20 to 80 mole % of a compound having the general formula:

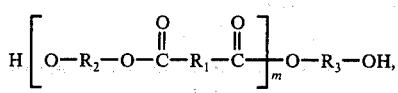

where $R_1$ represents the group formed by removal of the two carboxyl groups from a cycloaliphatic and/or aromatic dicarboxylic acid having 8 to 20 carbon atoms and $R_2$ and $R_3$ may be the same or different and represent groups formed by the removal of the two hydroxyl groups from a dihydroxy alcohol having 2 to 12 carbon atoms, and $m$ is an integer of 1 to 3, and of (b) 80 to 20 mole % of a compound having the general formula:

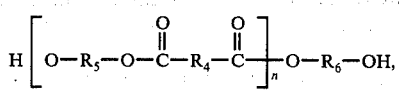

where $R_4$ represents the group formed by the removal of the two carboxyl groups from an aliphatic dicarboxylic acid having 2 to 12 carbon atoms, and $R_5$ and $R_6$ may be the same or different and represent groups formed by the removal of the two hydroxyl groups from a dihydroxy alcohol having 2 to 12 carbon atoms, and $n$ is an integer of 1 to 3.

By high solids coating compositions are to be understood here compositions having a solids content of at least 70% by weight and preferably at least 80% by weight. The solids content is determined in conformity with ASTM method D 1644-59 upon heating for 1 hour at 105° C.

The mixture of ester diols according to the invention comprises (a) an ester diol which may be formed from one or more cycloaliphatic or aromatic dicarboxylic acids, an anhydride or an alkyl ester thereof, the alkyl group generally containing 1 to 4 carbon atoms, and from one or more diols and/or corresponding epoxy compounds. Any suitable dicarboxylic acid or derivative thereof may be used such as, for example, tetrahydrophthalic acid, tetrahydrophthalic anhydride, endomethylene tetrahydrophthalic acid, hexachloroendomethylene tetrahydrophthalic acid, hexahydrophthalic acid, phthalic acid, p-carboxymethyl benzoic acid, dichlorophthalic acid, tetrachlorophthalic acid, dimethyl terephthalate, naphthalene-2,6-dicarboxylic acid, biphenyl-0,0'-dicarboxylic acid and the like. One or more dicarboxylic acids having 8 to 10 carbon atoms, for example, isophthalic acid and terephthalic acid are preferred. Any suitable diols and/or epoxy compounds may be used such as, for example, ethylene glycol, ethylene oxide, propane-1,2-diol, propane-1,3-diol, propylene oxide, 2,2-dimethyl propane diol, butane-1,2-diol, butane-1,3-diol, butane-1,4-diol, butylene oxide, hexane-1,6-diol, diethylene glycol, triethylene glycol, dipropylene glycol, 2-ethyl hexane-1,6-diol, 2,2,4-trimethyl pentane-1,3-diol, 2,2,4-trimethyl hexane-1,6-diol, octane-1,8-diol and the like. It is preferred that a diol having 2 to 9 carbon atoms should be used. The afore-described ester diols will hereinafter be referred to as "cyclic ester diol".

The mixture of ester diols according to the invention also comprises (b) an ester diol which may be formed from one or more aliphatic dicarboxylic acids, an anhydride or an alkyl ester thereof, the alkyl group generally containing 1 to 4 carbon atoms, and from one or more diols and/or corresponding epoxy compounds. Any suitable aliphatic dicarboxylic acid or derivative may be used for example, oxalic acid, malonic acid, succinic acid, succinic anhydride, glutaric acid, adipic acid, azelaic acid, sebacic acid, maleic acid, maleic anhydride, fumaric acid, itaconic acid, citraconic acid and the like. It is preferred that use should be made of one or more aliphatic dicarboxylic acids with 2 to 10 carbon atoms, more particularly dicarboxylic acids having 4 to 6 carbon atoms, which acids may or may not be ethylenically unsaturated, for instance, maleic acid and/or adipic acid. The diols and/or epoxy compounds to be used in the preparation of this type of ester diol may be the same as the ones used in the preparation of the cyclic ester diol, but there is no absolute need for that. It is preferred that use should be made of a diol having 2 to 9 carbon atoms. The above-envisaged type of ester diol will hereinafter be referred to as "aliphatic ester diol".

The number average molecular weight of the cyclic and the aliphatic ester diols is generally in the range of 254 to 2000 and 178 to 2000, respectively, and preferably in the range of 254 to 550 and 178 to 550, respectively. In general, the mixture of ester diols according to the invention forms more than 60% by weight of the binder (i.e., not including the curing agent of the coating composition), and preferably at least 75% by weight.

The ester diols to be used according to the invention may be prepared in any suitable manner. For example, one or more diols and/or epoxy compounds may be brought into reaction with one or more dicarboxylic acids, an anhydride and/or an alkyl ester thereof in a molar ratio of the order of 2:1. Alternatively, a dicarboxylic anhydride may first be reacted with a diol in a molar ratio of the order of 1:1, after which the resulting reaction product is reacted with an epoxy compound and preferably in a molar ratio of the order of 1:1. The esterification reactions take place at an elevated temperature, for instance, at 115° to 250° C., in the presence, if desired, of one or more organic solvents, such as toluene or xylene. It is preferred that the reaction should be so carried out that the average number of ester groups per molecule of the prepared ester diol is in the range of 2 to 4 (m or n 1 to 2). The reaction will generally be carried out in the presence of an esterification catalyst of a usual concentration. The catalyst may be any of the known catalysts and may, for instance, be an acid catalyst such as p-toluene sulphonic acid, a basic compound such as an amine or compounds such as zinc oxide, tetraisopropyl orthotitanate and triphenyl benzyl phosphonium chloride.

According to the invention the molar ratio of the cyclic ester diol to the aliphatic ester diol is generally between 8:2 and 2:8, and preferably between 3:1 and 1:3, and more particularly between 2:1 and 1:2.

The ester diols may be intermixed in any suitable manner; for instance, by first separately preparing the ester diols and subsequently intermixing them. Another suitable method consists in preparing one of the ester diols in the presence of the other ester diol or ester diols.

Depending on the method used for preparing the ester diols, other esterification products may have formed in small amounts and be present in the ester diols according to the invention. Such additional esterification products usually are the higher molecular reaction products of the employed dicarboxylic acids and diols or derivatives of these compounds, for instance, esterification products having 7 to 10 ester groups. As a rule, the ester diols according to the invention contain not more than about 5% by weight and often less than 1% by weight of such higher molecular esterification products.

As curing agent for the mixture of ester diols according to the invention there may be used any curing agent suitable for curing a compound containing hydroxyl groups. Suitable curing agents generally include N-methylol groups- and/or N-methylol ether groups-containing amino resins obtained by reacting an aldehyde, such as formaldehyde, with a compound containing amino groups or amido groups, such as melamine, urea, N,N'-ethylene urea, dicyandiamide and benzoguanamine; for the preparation of such compounds, see Houben-Weyl, Methoden der organischen Chemie, Band 14/2, pp. 319-371 (1963). It is preferred that the aforedescribed compounds should be entirely or partly etherified with alcohols having 1 to 6 carbon atoms, for instance, with methanol, ethanol, n-propanol, isopropanol, n-butanol, isobutanol, amyl alcohol, hexanol or mixtures of the alcohols referred to above. Particularly, use is made of a methylol melamine containing 4 to 6 methylol groups per molecule of melamine, at least 3 methylol groups being etherified with methanol, ethanol and preferably with butanol, or a butanol-etherified condensation product of formaldehyde and N,N'-ethylene diurea. More particularly, use is made of a hexalkoxymethyl melamine whose alkoxy groups contain 1 to 4 carbon atoms. Instead of or besides the above-described curing agents other suitable agents may be used, such as blocked or non-blocked polyisocyanates. The curing agent is generally used in such an amount that the molar ratio of the hydroxyl groups of the ester diol mixture to the reactive groups of the curing agent is approximately between about 0.7 and 1.5 and preferably between 0.8 and 1.3.

The coating composition may further contain usual auxiliary materials and additives, such as pigment dispersing agents, thixotropic agents or other means to influence the rheological properties, and colorants, solvents and accelerators for the curing reaction, for instance, acid compounds such as paratoluene sulphonic acid or blocked products thereof.

In any case the coating composition contains one or more pigments in a total amount of at least 30% by weight, calculated on the total solids content of the coating composition. Suitable pigments include the usual kinds, namely acid, neutral or basic pigments which may be of an organic or an inorganic nature. If desired, the pigments may have been pre-treated to modify the properties. As examples of suitable pigments may be mentioned titanium dioxide, iron oxide red, carbon black and phthalocyanin pigments. By pigments are also to be understood here metallic pigments such as those of aluminum and stainless steel. The coating composition ready for use generally has a viscosity not higher than 20 poises, and preferably 0.5 to 10 poises.

The coating composition may be applied to the substrate in any desirable way, for instance, by roller coating, spraying, brushing, sprinkling, flow-coating, dipping or electrostatic spraying.

Further, the coating composition may be cured or baked in the usual manner, for instance, at ambient temperature or at the usual temperatures between, say, 100° and 160° C., in a residence time of 20 to 60 minutes in a baking oven.

Preparation of Ester Diols

Method A

The following materials were charged into a reactor equipped with a stirrer, a thermometer and a condenser: 1461 grams of adipic acid, 3044 grams of propane-1,2-diol, 4 grams of zinc oxide. The mixture was heated to a temperature slightly above 150° C., upon which the water formed in the esterification reaction began to flow over. During the reaction 360 grams of water were distilled off, the temperature rising to 180° C. After the temperature had subsequently been decreased to 90° C., the excess of propane-1,2-diol (1522 grams) was distilled off in vacuo. The ester prepared contained on an average 2.5 ester groups per molecule ($n = 1.25$) and will hereinafter be referred to as di(propane-1,2-diol)adipate.

Method B

Into a reactor provided with a stirrer, a thermometer and a condenser there were successively charged 1942 grams of dimethyl terephthalate, 3044 grams of propane-1,2-diol and 2.5 grams of tetraisopropyl orthotitanate. The mixture was heated to a temperature slightly above 150° C., upon which the methanol formed in the trans-esterification reaction began to flow over. During the reaction 641 grams of methanol were distilled off, the temperature rising to 180° C. After the temperature had subsequently been decreased to 90° C., the excess of propane-1,2-diol (1522 grams) was distilled off in vacuo. The ester prepared contained on an average 3.0 ester groups per molecule ($m = 1.5$) and is hereinafter referred to as tri(propane-1,2-diol)terephthalate.

Method C

Into a reactor provided with a stirrer, a thermometer, a reflux condenser and a dropping funnel there were charged 1661 grams of isophthalic acid. The reactor was subsequently heated to 150° C., after which a mixture of 1276 grams of propylene oxide and 3 grams of triphenyl benzyl phosphonium chloride were added so slowly that a steady reflux at 150° C. was maintained. After the entire mixture had been added, the temperature was for one more hour kept at 150° C. After completion of the reaction the small excess of propylene oxide was removed in vacuo. The ester prepared had on an average 2.4 ester groups per molecule ($m = 1.2$) and is hereinafter referred to as di(propane-1,2-diol)isophthalate.

Method D

Into a reactor equipped with a stirrer, a thermometer, a reflux condenser and a dropping funnel there were charged 1481 grams of phthalic anhydride and 761 grams of propane-1,2-diol. The mixture was heated to 120° C., after which the reactor was cooled, so that the rising temperature of the contents as a result of reaction heat could be kept below 180° C. After the temperature had dropped to 150° C., a mixture of 638 grams of propylene oxide and 1.5 grams of triphenyl benzyl phosphonium chloride was added so slowly that a steady reflux at 150° C. was maintained. After the entire mixture had been added, the temperature was for one more hour kept at 150° C. After completion of the reaction, the small excess of propylene oxide was removed in vacuo. The ester prepared contained on an average 2.4 ester groups per molecule ($m = 1,2$) and is referred to hereinafter as di(propane-1,2-diol)phthalate.

In the following comparative examples and the other examples, which are not to be interpreted as limiting the scope of the present invention, the Persoz hardness was measured and expressed in seconds. The flexibility was determined with the aid of the "Falling-weight" tester (Erichsen - type 304) in accordance with ASTM D 2794-69, using a weight of 0.908 kg measuring 15.9 mm in diameter and a dropping opening of 16.3 mm, the value obtained being expressed in kg-cm. In accordance with this method the values were determined both for the coated side and the back of the steel test panel (Bonder 120). Moreover, the conical mandrel test was carried out, its results being expressed in mm. An acceptable minimum value of the hardness is about 200 seconds. An acceptable minimum value of the flexibility is of the order of 35 kg-cm, the highest value to be measured being 85 kg-cm. The conical mandrel test (carried out in accordance with ASTM D 522-41) gives a value below the lower measuring value 1 in the case of very flexible coatings; a value of 104 in this test is indicative of the coating being very brittle. The gloss was determined at 60° and at 20° (ASTM D-523). A gloss value of 90 at 60° is considered very high. A gloss value above 80 at 20° is also regarded as high. The values of the measured properties are listed in Table 1.

The sprayable compositions described in the comparative examples and in the other examples all have a viscosity of 25 seconds at 20° C. (Ford cup No. 4). The resulting coating (after baking) had the thickness given in Table 1.

EXAMPLES

Comparative Example 1

The following components were homogeneously mixed:
tri(propane-1,2-diol)terephthalate (prepared by method B): 280 g
hexamethoxymethyl melamine: 130 g
20% solution of p-toluene sulphonic acid in isopropanol: 6 g This mixture was diluted to spray viscosity by combining it with 68 grams of a mixture of equal parts by weight of xylene and ethyl glycol acetate. The resulting unpigmented coating composition was applied to a steel panel treated with zinc phosphate (Bonder 120) and cured for 30 minutes at a temperature of 130° C. The coating obtained had a good hardness and was not brittle (see also Table 1).

Comparative Example 2

To find out the influence of the presence of a pigment in the properties of the coating a sprayable coating composition having the following constituents:
tri(propane-1,2-diol)terephthalate (prepared by method B): 280 g
hexamethoxymethyl melamine: 130 g
20% solution of p-toluene sulphonic acid in isopropanol: 10 g
titanium dioxide: 282 g
mixture of equal parts by weight of xylene and ethylglycol acetate: 117 g
was applied and tested in the same manner as described in Comparative Example 1. It was found that, although the baked pigmented coating had a good hardness, it was very brittle (see also Table 1).

Comparative Example 3

A pigmented coating composition prepared from an aliphatic ester diol was tested in the same way as indicated in Comparative Example 1.

The coating composition was made up of the following constituents:
di(propane-1,2-diol)adipate (prepared by method A): 260 g
hexamethoxymethyl melamine: 130 g
20% solution of p-toluene sulphonic acid in isopropanol: 10 g
titanium dioxide: 267 g
mixture of equal parts by weight of xylene and ethylglycol acetate: 89 g
It was found that, although the baked, pigmented coating had a high flexibility, its hardness was insufficient (see also Table 1).

Comparative Example 4

Into a reactor provided with a stirrer, a thermometer, a reflux condenser and a dropping funnel there were charged 830 grams of terephthalic acid and 1095 grams of adipic acid. The mixture was heated to a temperature of 150° C., after which a mixture of 1600 grams of propylene oxide and 4 grams of triphenylbenzylphosphonium chloride was added so slowly that a steady reflux at 150° C. was maintained. After the entire mixture had been added, the temperature was kept at 150° C. for one more hour. At conclusion of the reaction the small excess of propylene oxide was removed in vacuo. The ester obtained had on an average 3 ester groups per molecule.

A coating composition prepared from the aforedescribed ester diol was tested in the same way as described in Comparative Example 1. The coating composition was made up as follows:
ester diol: 236 g
hexamethoxymethyl melamine: 114 g
20% solution of p-toluene sulphonic acid in isopropanol: 9 g
titanium dioxide: 240 g mixture of equal parts by weight of xylene and ethylglycol acetate: 89 g It was found that, although the baked, pigmented coating had a high flexibility, its hardness was insufficient (see also Table 1).

EXAMPLE 1

The following components were homogeneously mixed:

tri(propane-1,2-diol)terephthalate (prepared by method B): 98 g di(propane-1,2-diol)adipate (prepared by method A): 138 g hexamethoxymethyl melamine: 114 g 20% solution of p-toluene sulphonic acid in isopropanol: 9 g titanium dioxide: 240 g mixture of equal parts by weight of xylene and ethylglycol acetate: 90 g The sprayable composition was applied to a steel panel treated with zinc phosphate (Bonder 120) and cured for 30 minutes at a temperature of 130° C. The properties of the baked coating are listed in Table 1.

EXAMPLE 2

Example 1 was repeated, except that for the preparation of the coating composition use was made of 98 grams of di(propane-1,2-diol)isophthalate instead of the 98 grams of tri(propane-1,2-diol)terephthalate. The isophthalate was prepared by method C. The coating composition was applied and tested as indicated in Example 1. The properties of the baked coating are listed in Table 1.

EXAMPLE 3

Example 1 was repeated, except that for the preparation of the coating composition use was made of 98 grams of di(propane-1,2-diol)phthalate instead of the 98 grams of tri(propane-1,2-diol)-terephthalate. The phthalate was prepared by method D. The coating composition was applied and tested as indicated in Example 1. The properties of the baked coating are mentioned in Table 1.

EXAMPLE 4

The following components were homogeneously intermixed:

di(propane-1,2-diol)tetrahydrophthalate (prepared analogously to method D; $m = 1.25$): 133 g di(hexane-1,6-diol)maleinate (prepared analogously to method A; $n = 1.25$): 111 g hexamethoxymethyl melamine: 106 g 20% solution of p-toluene sulphonic acid in isopropanol: 9 g titanium dioxide: 240 g mixture of equal parts by weight of xylene and ethylglycol acetate: 110 g The sprayable composition was applied and tested as indicated in Example 1. The properties of the baked coating are listed in Table 1.

EXAMPLE 5

The following components were homogeneously intermixed:

di(propane-1,2-diol)isophthalate (prepared by method C): 123 g di(hexane-1,6-diol)maleinate (prepared analogously to method A; $n = 1.25$): 121 g hexamethoxymethyl melamine: 106 g 20% solution of p-toluene sulphonic acid in isopropanol: 9 g titanium dioxide: 240 g mixture of equal parts by weight of xylene and ethylglycol acetate: 100 g The sprayable composition was applied and tested in the same way as indicated in Example 1. The properties of the baked coating are listed in Table 1.

EXAMPLE 6

The following components were homogeneously intermixed:

di(2,2,4-trimethyl pentane-1,3-diol)isophthalate (prepared analogously to method A; $m = 1.2$): 180 g di(2,2,4-trimethyl pentane-1,3-diol)adipate (prepared by using the procedure of method A; $n = 1.25$): 90 g hexamethoxymethyl melamine: 95 g 20% solution of p-toluene sulphonic acid in isopropanol: 9 g titanium dioxide: 240 g mixture of equal parts by weight of xylene and ethylglycol acetate: 92 g The sprayable composition was applied and tested as indicated in Example 1. The properties of the baked coating are listed in Table 1.

EXAMPLE 7

The following components were homogeneously intermixed:

di(neopentyl glycol) isophthalate (prepared analogously to method A; $m = 1.3$): 170 g di(neopentyl glycol)adipate (prepared analogously to method A; $n = 1.2$): 85 g hexamethoxymethyl melamine: 110 g 20% solution of p-toluene sulphonic acid in isopropanol: 9 g titanium dioxide: 240 g mixture of equal parts by weight of xylene and ethylglycol acetate: 96 g The sprayable composition was applied and tested as indicated in Example 1. The properties of the baked coating are listed in Table 1.

EXAMPLE 8

Example 7 was repeated, except that for the preparation of the coating composition use was made of 85 grams of di(2,2,4-trimethyl pentane-1,3-diol)adipate instead of the 85 grams of di(neopentyl glycol)adipate. The adipate was prepared by method A ($n = 1.25$). The coating composition was applied and tested as indicated in Example 1. The properties of the baked coating are listed in Table 1.

EXAMPLE 9

Example 7 was repeated, except that for the preparation of the coating composition both the di(neopentyl glycol)isophthalate and the di(neopentyl glycol)adipate were used in amounts of 128 grams. The coating composition was applied and tested in the same way as indicated in Example 1. The properties are listed in Table 1.

EXAMPLE 10

Example 8 was repeated, except that for the preparation of the coating composition both the di(2,2,4-trimethyl pentane-1,3-diol) adipate and the di(neopentyl glycol)isophthalate were used in amounts of 128 grams.

The coating composition was applied and tested as indicated in Example 1. The properties are listed in Table 1.

EXAMPLE 11

Example 7 was repeated, except that for the preparation of the coating composition use was made of 170 grams of di(2,2,4-trimethyl pentane-1,3-diol)isophthalate instead of the 170 grams of di(neopentyl glycol)isophthalate. The coating composition was applied and tested as indicated in Example 1. The properties are listed in Table 1.

TABLE 1

| COMPARATIVE EXAMPLE | COATING THICKNESS (μm) | PERSOZ HARDNESS (sec.) | FALLING-WEIGHT TEST KG-CM) | | CONICAL MANDREL TEST (mm) | GLOSS | |
|---|---|---|---|---|---|---|---|
| | | | COATING SIDE | BACK | | 60° | 20° |
| 1 | 40 | 340 | > 85 | > 85 | < 1 | — | — |
| 2 | 40 | 310 | 14 | < 2 | > 104 | 99 | 75 |
| 3 | 45 | 82 | > 85 | > 85 | < 1 | 93 | 70 |
| 4 | 40 | 90 | > 85 | > 85 | < 1 | 91 | 70 |
| EXAMPLE | | | | | | | |
| 1 | 40 | 255 | > 85 | > 85 | < 1 | 97 | 82 |
| 2 | 40 | 250 | > 85 | > 85 | < 1 | 95 | 75 |
| 3 | 25 | 240 | > 85 | > 85 | < 1 | 97 | 82 |
| 4 | 35 | 220 | > 85 | > 85 | < 1 | 96 | 86 |
| 5 | 40 | 260 | > 85 | > 85 | < 1 | 97 | 89 |
| 6 | 40 | 280 | > 85 | > 85 | < 1 | 92 | 85 |
| 7 | 40 | > 300 | > 85 | > 85 | < 1 | 96 | 90 |
| 8 | 40 | > 300 | > 85 | > 85 | < 1 | 98 | 91 |
| 9 | 40 | > 300 | > 85 | > 85 | < 1 | 93 | 85 |
| 10 | 40 | > 300 | > 85 | > 85 | < 1 | 96 | 88 |
| 11 | 40 | > 300 | > 85 | > 85 | < 1 | 95 | 88 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A high solids pigmented coating composition prepared from a blend of an ester diol as binder and a curing agent for the binder, characterized in that (1) the ester diol is a mixture of
   (a) 20-80 mole % of an ester diol having the general formula:

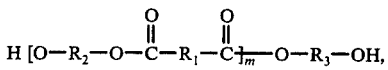

where $R_1$ represents the group formed by abstraction of the carboxyl groups from a cycloaliphatic and/or aromatic dicarboxylic acid having 8 to 20 carbon atoms and $R_2$ and $R_3$ may be the same or different and represent groups formed by abstraction of the two hydroxyl groups from a divalent alcohol having 2 to 12 carbon atoms, and $m$ is a number of 1-3, and
   (b) 80-20 mole % of an ester diol having the general formula:

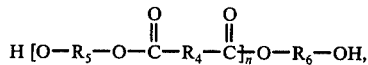

where $R_4$ represents the group formed by abstraction of the two carboxyl groups from an aliphatic dicarboxylic acid having 2 to 12 carbon atoms and $R_5$ and $R_6$ may be the same or different and represent groups formed by abstraction of the two hydroxyl groups from a divalent alcohol having 2 to 12 carbon atoms, and $n$ is a number of 1-3,
   (2) the curing agent for the binder is an aminoplast, and
   (3) the amount of pigment in said coating composition is at least 30% by weight, based on the total solids content.

2. The coating composition of claim 1 characterized in that the molar ratio of the ester diols is between 3:1 and 1:3.

3. The coating composition of claim 1 characterized in that the molar ratio of the ester diols is between 2:1 and 1:2.

4. The coating composition of claim 1 characterized in that one of the ester diols is formed from a cycloaliphatic or aromatic dicarboxylic acid containing 8 to 10 carbon atoms and a diol containing 2 to 9 carbon atoms.

5. The coating composition of claim 1 characterized in that one of the ester diols is formed from an aliphatic dicarboxylic acid containing 2 to 10 carbon atoms and a diol containing 2 to 9 carbon atoms.

6. The coating composition of claim 1 characterized in that the molar ratio of the hydroxyl groups of the ester diol mixture to the reactive groups of the curing agent is between about 0.7 and about 1.5.

7. The process for the preparation of a coating composition having a high solids content characterized in that it comprises the preparation of the coating composition of claim 1.

8. The coating composition of claim 1 wherein said curing agent for the binder is a methylol melamine containing 4 to 6 methylol groups per molecule of melamine, at least 3 of said methylol groups being etherified with an alcohol selected from the group consisting of methanol, ethanol, and butanol.

9. The coating composition of claim 1 wherein said curing agent for the binder is an N-methylol group- and/or N-methylol ether group- containing amino resin formed by reacting an aldehyde with a compound containing amino groups or amido groups.

* * * * *

Notice of Adverse Decision in Interference

In Interference No. 100,360, involving Patent No. 4,104,240, R. Buter, HIGH SOLIDS PIGMENT COATING COMPOSITION, final judgment adverse to the patentee was rendered Nov. 2, 1982, as to claims 1, 2 and 4–9.
[*Official Gazette May 17, 1983.*]